L. L. B. DENIS.
ELASTIC WHEEL.
APPLICATION FILED JAN. 29, 1908.

1,107,916.

Patented Aug. 18, 1914.
3 SHEETS—SHEET 1.

WITNESSES:
N. M. Avery
J. P. Davis

INVENTOR
Luc Léon Basile Denis
BY
Munn & Co.
ATTORNEYS

L. L. B. DENIS.
ELASTIC WHEEL.
APPLICATION FILED JAN. 29, 1908.
1,107,916.
Patented Aug. 18, 1914.
3 SHEETS—SHEET 2.
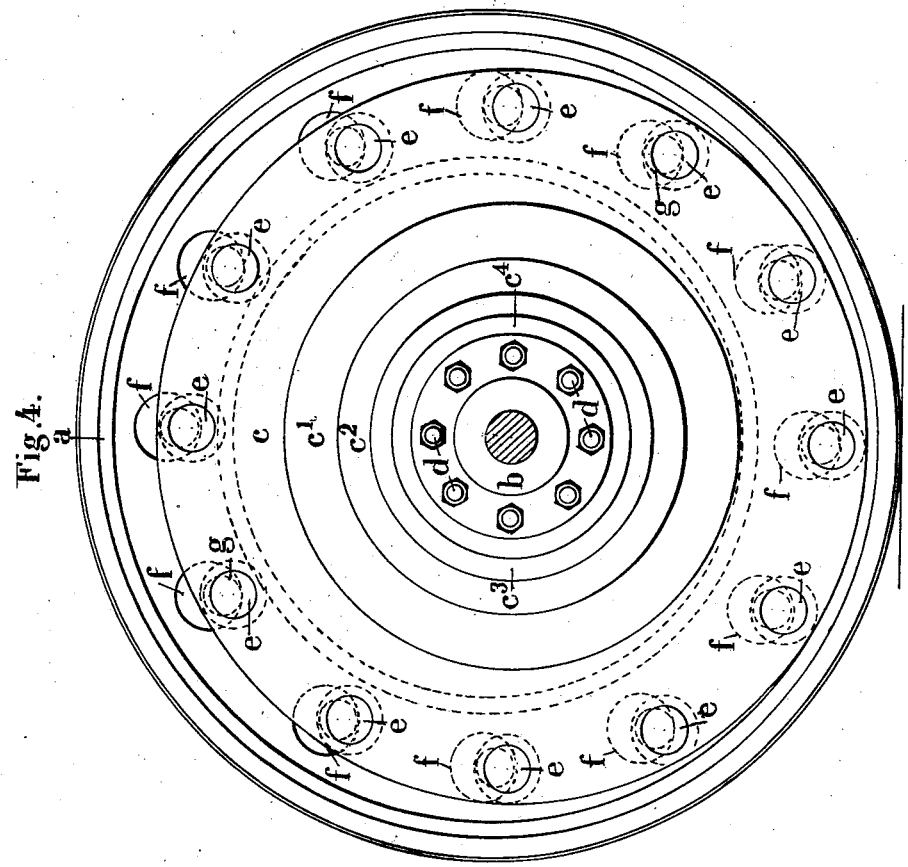
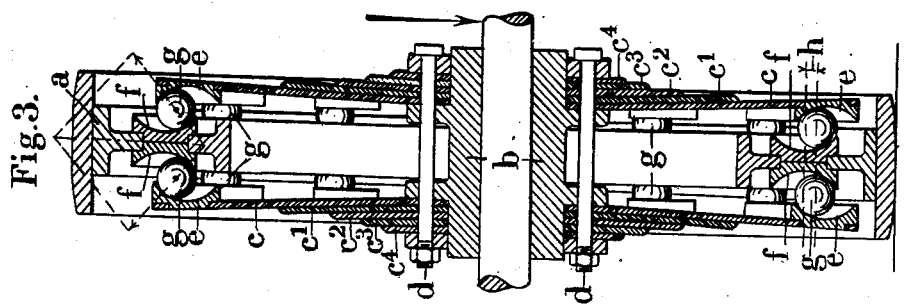
WITNESSES:
W. M. Avery
J. P. Davis
INVENTOR
Luc Léon Basile Denis
BY
Munn & Co
ATTORNEYS

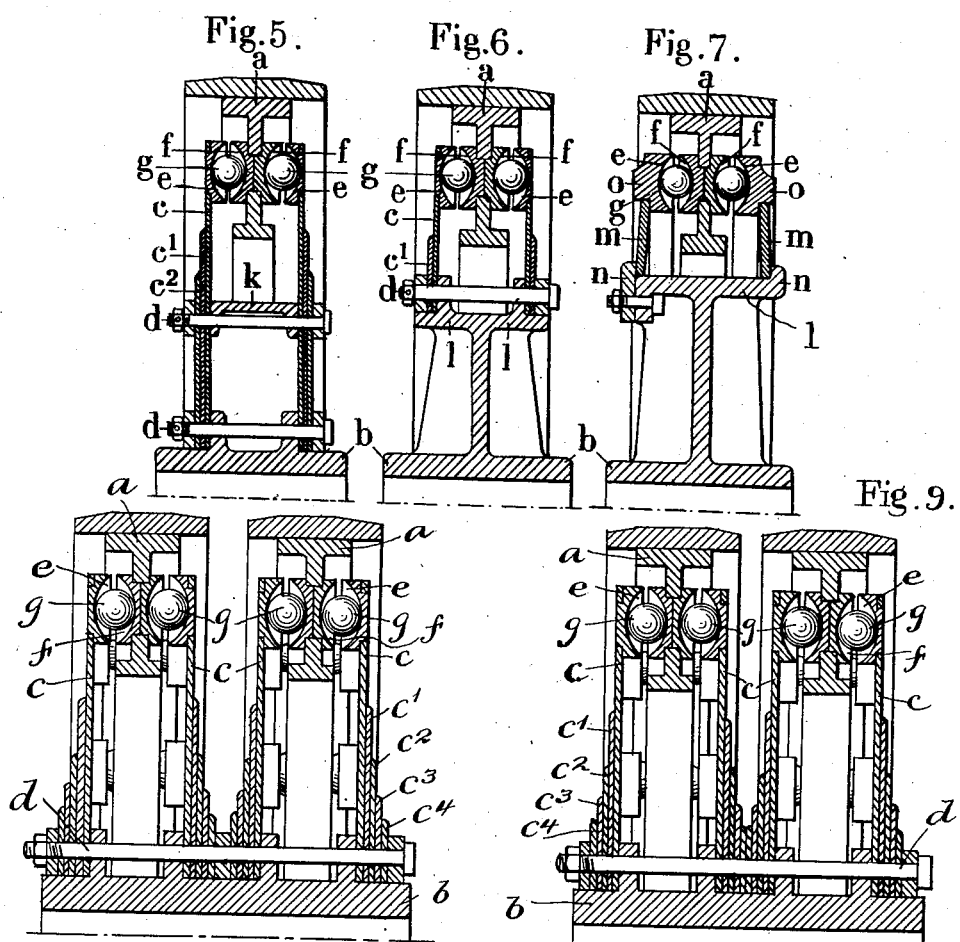

UNITED STATES PATENT OFFICE.

LUC LEON BASILE DENIS, OF PARIS, FRANCE.

ELASTIC WHEEL.

1,107,916.  Specification of Letters Patent.  Patented Aug. 18, 1914.

Application filed January 29, 1908. Serial No. 413,179.

*To all whom it may concern:*

Be it known that I, LUC LEON BASILE DENIS, of 155 Boulevard de Ménilmontane, in the city of Paris, Republic of France, civil engineer, have invented an Elastic Wheel, of which the following is a full, clear, and exact description.

This invention relates to an elastic wheel for motor cars or other vehicles.

This wheel is characterized by the fact that the rigid rim is connected to the hub through the agency of a transversely elastic connection so combined that all the parts of this elastic connection will work in the same manner and will be submitted to the same stresses, when the wheel rotates as well as when it is at rest.

Contrarily to what happens with certain spring wheels in which each spring is successively compressed and slackened at each revolution of the wheel, the tension of the parts constituting the present elastic connection is in no way altered as long as the wheel rolls on a perfectly smooth surface and, consequently, this elastic connection does not effect any useless work and there is no useless wearing of the springs due to successive stretching or slackening other than that due to inequalities of the road. The present elastic connection also maintains the rim strictly in the plane of the wheel as it is a self-guiding device, and, therefore, eliminates all slides or other means ordinarily used for maintaining the rim in the plane of the wheel and which are objectionable on account of dust, sand, gravel from the roads getting between the sliding surfaces.

In the present wheel, the elastic device connecting the rim and the hub, and which is attached to the latter is so arranged as to exert upon the whole periphery of the web of the rim and upon its two faces, stresses which are directed at right angles to the latter when the center of the rim registers with the axis of the hub. Whenever this concentric position is disturbed under the influence of the load, or the inequalities of the road, etc., the said stresses become oblique but parallel in direction and of equal size and they tend to bring back the center of the rim toward the axis of the hub.

The accompanying drawing shows by way of example several modes of construction of the elastic wheel.

Figure 1:
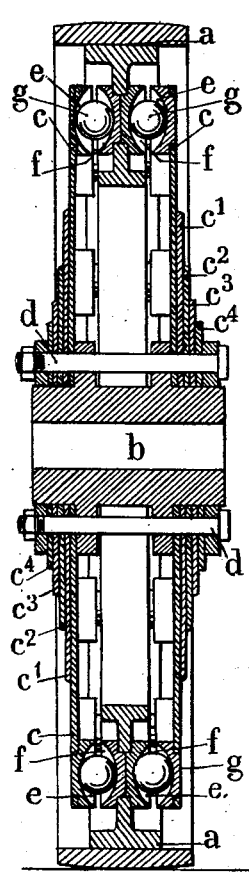
Figure 2:
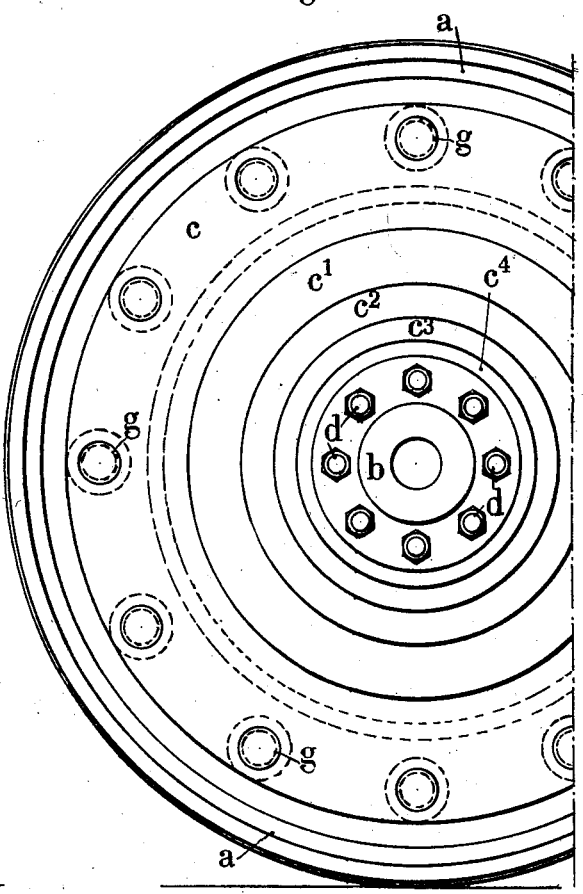

Figures 1 and 2 show the wheel in cross vertical section and in elevation respectively in the position of rest, that is to say when the hub has no load to bear. Figs. 3 and 4 are similar views showing the position of the parts when the hub carries a load. Figs. 5, 6 and 7, are sectional views of modifications, and Figs. 8 and 9 are sectional views showing other modifications.

The wheel represented in Figs. 1 to 4 comprises a rigid rim $a$ of any given section connected with the hub $b$ through a transversely elastic device constituted by two side members each composed of concentric disks $c$, $c'$, $c^2$, $c^3$, $c^4$ of steel sheet of different diameters and superposed in the same way as the different blades of a carriage spring; these disks are secured to the hub $b$ by means of bolts $d$, as shown on the drawing, or they may be secured by any other suitable means.

Each disk $c$ is provided near its periphery with a number of spherical recesses or cavities $e$ and similar recesses or cavities $f$ are provided on both sides of the web of the rim $a$ so as to come opposite the recesses $f$ of the rim when the center of the latter registers with the axis of the hub $b$ as shown in Figs. 1 and 2.

Balls $g$ are interposed between the recesses $e$ and $f$. The radius of these balls is smaller than the radius of the spherical cavities or recesses.

The disks $c$ $c'$ $c^2$ $c^3$ $c^4$ constituting the two elastic side members are mounted in such a manner as to exert a lateral pressure upon the rim through the medium of the recesses $e$ and $f$ and of the balls $g$ arranged in the said recesses.

When the hub $b$ has no load to support, the wheel being placed flatwise, for instance, in its setting position, the balls $g$ under the influence of the initial pressure exerted by the side members, are caused to arrange themselves exactly in the middle of the recesses $e$ $f$ by forcing the latter to come exactly opposite each other, thereby causing the center of the rim to register with the axis of the hub, as shown in Figs. 1 and 2.

When a vertical stress is exerted upon the hub $b$, while the rim $a$ is resting on the ground, the hub will be lowered carrying down the cheeks and the recesses $e$, the balls $g$ then take the position shown in Figs. 3 and 4, by forcing outwardly the elastic side members. If the loaded wheel now rolls upon a plane surface, the balls $g$ will roll in their recesses and describe a circle, the radius of which is equal to the displacement of the center of these balls, Fig. 3, with reference to the axis of the recesses $f$ under the action of the vertical stress exerted upon the hub $b$.

From the above described construction it will be observed that:

1st. During the motion of the wheel on a plane surface, the edges of the disks $c$ maintain the same spacing and consequently the tension of the two side members remains constant.

2nd. The rim is maintained in the middle plane of the wheel between the two side members which are mounted as above described in such a manner as to constantly exert a lateral pressure upon the two faces of the rim and thus insure the guiding thereof.

3rd. The rim is always brought back toward the center of the hub owing, to the disposition of the recesses, and the stress which is necessary to remove it from this position increases with the corresponding amount of motion away from it.

4th. Besides its relative motion in the plane of the wheel, the rim can have a slight circumferential motion in relation to the hub and preserve the same resiliency in this as well as in its radial motion. Consequently when acting as a driving wheel, it works as an all-round shock-absorber.

5th. The wheel possesses a certain lateral elasticity and if the rim is submitted to a lateral stress (when bumping against an obstacle for instance), this stress is transmitted by the rim to the cheek $c$ opposite to the side where the stress occurs and it increases the tension on this cheek, while the other cheek expands owing to its initial tension, and follows the rim thus preventing the balls from escaping out of the recesses.

6th. The amount of resiliency of the rim for a given tension of the side members can be proportioned at will and a greater or lesser strain upon the rim can be obtained at same time by varying the depth of the recesses and maintaining the same balls, or else by giving to these cavities a shape other than the sphere, provided the surface of this cavity be always a surface of revolution, the cavity could for instance be a hollow cone, in this case, the tension on the side members increases proportionally to the vertical stress, but the spherical shape is the most convenient on account of its being easily manufactured and because with this shape, the amount of resilient motion does not increase in the same proportion as the vertical stress.

In the modification illustrated in Fig. 5, the two elastic side members fastened to the hub are braced by means of a ring $k$ concentric with the hub $b$ and upon which the disks $c$, $c'$, $c^2$, constituting these side members are bolted. This construction increases the stiffness of the side members and decreases the length of the elastic part thereof.

In the modification illustrated in Fig. 6 the elastic side members are shown secured to an internal rim $l$ carried by the hub.

In the modification illustrated in Fig. 7 the side members instead of being formed of disks, can be formed of washers $m$ fulcrumed on one edge against shoulders $n$ with which the internal rim $l$ is provided, and on the other edge upon rings $o$ on the internal face of which recesses $e$ are provided.

The improvement can be applied to wheels of all kinds and sizes.

Wheels may also be made having a plurality of independent rims connected with a common hub, each rim having its own elastic connection fastened to said hub as shown in Fig. 8.

The wheel may also comprise a single rim provided with two or more elastic connections integral with the hub, as shown in Fig. 9.

Certain of the constructions which were originally disclosed in this application and which have been eliminated are broadly covered in my co-pending application, Serial No. 822,290, filed March 4th, 1914.

Claims:

1. An elastic wheel, comprising a rigid rim provided on its internal face with a medial web having recesses in its faces adjacent to the rim, a hub, two elastic side members, secured to the hub and extending on opposite sides of the web of the rim, each side member being provided in its internal face adjacent to the periphery, with recesses opposite the recesses of the said web, and balls in the recesses of the side members and web, the recesses being of greatest depth at the center and presenting inclined surfaces upon which the balls may roll.

2. An elastic wheel, comprising a rigid rim provided on its internal face with a medial web having recesses in its faces adjacent to the rim, a hub, two spring supported disks rigidly secured in the hub and extending on opposite sides of the web, each disk being provided on its internal face adjacent to the periphery thereof with recesses opposite the recesses of the web, and balls in the recesses of the disks and web, the recesses being of greatest depth at the center and presenting inclined surfaces upon which the balls may roll.

3. An elastic wheel, comprising a rim provided with an internal medial web having recesses in its opposing faces adjacent the rim, spring side members secured to the hub and formed of a plurality of plates of different diameters and overlapping one another, the plate of greatest diameter of each side member being provided on its internal face adjacent the periphery with recesses opposite the recesses of the web, and balls in the recesses of the side members and web, the recesses being of greatest depth at the center and presenting inclined surfaces upon which the balls may roll.

4. An elastic wheel comprising two concentric members one including a rigid rim and presenting two series of recesses, rigid in respect to said rim, and disposed closely adjacent thereto and facing in opposite directions, the other of said members including a hub, and spaced elastic side members secured thereto, and provided adjacent to said rim with separate sets of oppositely facing recesses, each of said last mentioned recesses being opposed to a corresponding one of said first mentioned recesses, and a ball in each pair of opposed recesses, said balls being of greater diameter than the depth of said recesses and each recess being of greatest depth at the center, and presenting inclined surfaces upon which the balls may roll.

The foregoing specification of my elastic wheel signed by me this 14th day of January 1908.

LUC LEON BASILE DENIS.

Witnesses:
AUTLOUR BELENE,
MAURICE H. PIGUET.